(12) United States Patent
Kermani

(10) Patent No.: US 6,697,796 B2
(45) Date of Patent: Feb. 24, 2004

(54) VOICE CLIP SEARCH

(75) Inventor: Bahram Ghaffarzadeh Kermani, Whitehall, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/482,062

(22) Filed: Jan. 13, 2000

(65) Prior Publication Data

US 2002/0138468 A1 Sep. 26, 2002

(51) Int. Cl.⁷ .............................................. G06F 17/30
(52) U.S. Cl. ......................... 707/3; 707/10; 379/88.14; 704/9; 704/206; 704/278; 386/96; 386/104
(58) Field of Search .................... 707/1–10; 386/69–70, 386/125–126, 95, 98, 4, 45, 111–112, 96, 104; 379/88.14; 704/278, 9, 260

(56) References Cited

U.S. PATENT DOCUMENTS

| | | | | |
|---|---|---|---|---|
| 5,276,731 A | * | 1/1994 | Arbel et al. | 379/88.14 |
| 5,434,910 A | * | 7/1995 | Johnson et al. | 379/88.15 |
| 5,539,808 A | * | 7/1996 | Inniss et al. | 379/88.22 |
| 5,572,576 A | * | 11/1996 | Klausner et al. | 379/67 |

(List continued on next page.)

*Primary Examiner*—Kim Vu
*Assistant Examiner*—Anh Ly
(74) *Attorney, Agent, or Firm*—William H. Bollman (57) ABSTRACT

A technique and apparatus to allow a digital search of the entries in a digital audio database such as the Flash memory of a telephone answering system, the hard drive of a voice messaging system, the audio tracks on a compact disk, a cassette tape, a digital video disk (DVD), a videotape, etc. In one disclosed embodiment, each entry in the digital audio database (e.g., each audio track, each voice message, etc.) is converted into textual information, and the converted textual information is associated with a particular audio segment within the digital audio database. The textual information allows a digital search to be performed for a particular voice message, or portion of a voice message, in a telephone answering device, or for a particular song on a music CD, etc. Once the particular audio segment(s) containing a particular textual string is (are) located, that particular audio segment may be played or otherwise accessed, either in whole or in relevant part. While the described embodiments relate to a telephone answering device or a compact disk player, the principles of the present invention relate equally to any search mechanism for a particular digital audio segment stored in a database.

16 Claims, 7 Drawing Sheets

U.S. PATENT DOCUMENTS

| | | | | |
|---|---|---|---|---|
| 5,647,002 A | * | 7/1997 | Brunson | 379/88.18 |
| 5,649,060 A | * | 7/1997 | Ellozy et al. | 704/278 |
| 5,724,410 A | * | 3/1998 | Parvulescu et al. | 379/88.18 |
| 5,884,262 A | * | 3/1999 | Wise et al. | 704/270.1 |
| 6,035,336 A | * | 3/2000 | Lu et al. | 709/232 |
| 6,061,718 A | * | 5/2000 | Nelson | 379/88.14 |
| 6,085,231 A | * | 7/2000 | Agraharam et al. | 379/88.14 |
| 6,088,428 A | * | 7/2000 | Trandal et al. | 379/88.02 |
| 6,104,803 A | * | 8/2000 | Weser et al. | 379/230 |
| 6,173,259 B1 | * | 1/2001 | Bijl et al. | 704/235 |
| 6,175,820 B1 | * | 1/2001 | Dietz | 704/235 |
| 6,181,736 B1 | * | 1/2001 | McLaughlin et al. | 379/93.01 |
| 6,181,780 B1 | * | 1/2001 | Finnigan | 379/88.02 |
| 6,192,340 B1 | * | 2/2001 | Abecassis | 704/270 |
| 6,199,076 B1 | * | 3/2001 | Logan et al. | 707/501 |
| 6,215,858 B1 | * | 4/2001 | Bartholomew et al. | 379/88.17 |
| 6,215,860 B1 | * | 4/2001 | Johanson et al. | 379/88.28 |
| 6,222,909 B1 | * | 4/2001 | Qua et al. | 379/88.22 |
| 6,226,362 B1 | * | 5/2001 | Gerszberg et al. | 379/88.13 |
| 6,243,676 B1 | * | 6/2001 | Witteman | 704/243 |
| 6,252,946 B1 | * | 6/2001 | Glowny et al. | 379/88.22 |
| 6,283,760 B1 | * | 9/2001 | Wakamoto | 434/156 |
| 6,335,962 B1 | * | 1/2002 | Ali et al. | 379/88.11 |
| 6,341,160 B2 | * | 1/2002 | Tverskoy et al. | 379/88.13 |
| 6,345,252 B1 | * | 2/2002 | Beigi et al. | 704/272 |
| 6,374,223 B1 | * | 4/2002 | Donaldson et al. | 704/260 |
| 6,377,296 B1 | * | 4/2002 | Zlatsin et al. | 348/143 |
| 6,385,306 B1 | * | 5/2002 | Baxter, Jr. | 379/88.13 |
| 6,389,114 B1 | * | 5/2002 | Dowens et al. | 379/88.14 |
| 6,401,068 B1 | * | 6/2002 | Cherveny et al. | 704/275 |
| 6,404,856 B1 | * | 6/2002 | Wilcox et al. | 379/88.22 |
| 6,408,128 B1 | * | 6/2002 | Abecassis | 386/95 |
| 6,434,520 B1 | * | 8/2002 | Kanevsky et al. | 704/243 |
| 6,438,216 B1 | * | 8/2002 | Aktas | 379/88.14 |
| 6,490,558 B1 | * | 12/2002 | Kahn et al. | 704/260 |
| 6,507,643 B1 | * | 1/2003 | Groner | 379/88.14 |
| 6,567,506 B1 | * | 5/2003 | Kermani | 378/88.01 |
| 6,603,921 B1 | * | 8/2003 | Kanevsky et al. | 386/96 |
| 2003/0097262 A1 | * | 5/2003 | Nelson | 704/235 |

* cited by examiner

FIG. 1

FIG. 2A
AUDIO TABLE SECTOR

FIG. 2B
VOICE CLIP AUDIO TEXT SECTOR

300

| Ref | Content | Index |
|---|---|---|
| 332 | AUDIO TEXT | 0 (0) |
| 334 | START TIME STAMP OF AUDIO TRACK OR MSG | 1 |
| 336 | AUDIO TEXT | 2 |
| 338 | START TIME STAMP OF AUDIO TRACK OR MSG | 3 |
| 340 | AUDIO TEXT | 4 |
| 342 | START TIME STAMP OF AUDIO TRACK OR MSG | 5 |
| | ⋮ | |
| 344 | AUDIO TEXT | 126 |
| 346 | START TIME STAMP OF AUDIO TRACK OR MSG | 127 (7F) |

FIG. 3

FIG. 4
AUDIO TEXT TABLE

104

| TEXTUAL DATA (e.g., ASCII) | AUDIO TRACK OR MSG | START TIME STAMP OF TRACK OR MSG |
|---|---|---|
|  |  |  |
|  |  |  |
|  |  |  |
|  |  |  |
|  |  |  |
|  |  |  |
|  |  |  |

FIG. 6A
MESSAGE TABLE SECTOR
PRIOR ART
800

| | |
|---|---|
| TIME/DATE | —802 |
| TAG | —804 |
| CODER | —806 |
| NEW/OLD | —808 |
| DELETED/NON-DELETED | —810 |
| # BYTES IN LAST SECTOR | —812 |
| LINK LIST | —814 |
| ETC. | —816 |

FIG. 6B
SPEECH DATA SECTOR
PRIOR ART
900

| | | |
|---|---|---|
| 902— ENCODED SPEECH DATA | 0 | (0) |
| 904— ENCODED SPEECH DATA | 1 | |
| 906— ENCODED SPEECH DATA | 2 | |
| ⋮ | ⋮ | |
| 908— ENCODED SPEECH DATA | 127 | (7F) |

VOICE CLIP SEARCH

BACKGROUND OF THE INVENTION

1. Field of the Invention

This invention relates generally to the search of a digital audio database such as a series of voice messages stored in a telephone answering device, compact disk (CD), audio cassette tape, etc. More particularly, it relates to an efficient and useful technique and apparatus for searching an audio database for the identification and/or playback of a particular voice message, audio track, etc. containing a particular voice clip.

2. Background of Related Art

Digital audio databases in common use today include such devices as the Flash memory of a telephone answering device, the hard drive of a voice messaging system, the CD of a stereo system, or the audio cassette tape of a tape player system. While each of these systems is capable of storage and/or playback of uncompressed digital audio, data compression techniques are often employed to maximize the storage capacity of a given digital audio storage medium.

Whether or not digital compression is employed, the audio can be characterized as being stored as a representation of an analog waveform signal, which does not lend itself to digital searches for particular audio content.

The Flash memory, hard drive, CD, cassette tape, etc. are capable of storage of a significant amount of audio (e.g., from 30 minutes, to hours or more.

Conventionally, digital audio databases (e.g., CDs, Flash memory, etc.) are either separated by silent periods, or beeps, or by track numbers. To advance or rewind to a particular message, audio track, etc., a user can either designate an absolute message number, or audio track number, for playback, or designate a relative number of messages or tracks to skip forward or backward. In either case, the conventional search mechanism for a digital audio database such as these is limited to the identification of a particular message or audio track based on its position within the database (i.e., message number or audio track number), and not based on the substance within any particular message.

Conventional search mechanisms for digital audio databases work sufficiently for applications where a user knows which particular voice message or audio track that the user would like to listen to. However, if a user does not know which particular voice message or audio track contains a particular passage which they desire to hear, they typically must listen to all messages or audio tracks until the desired message or audio track is found.

Figure 5:
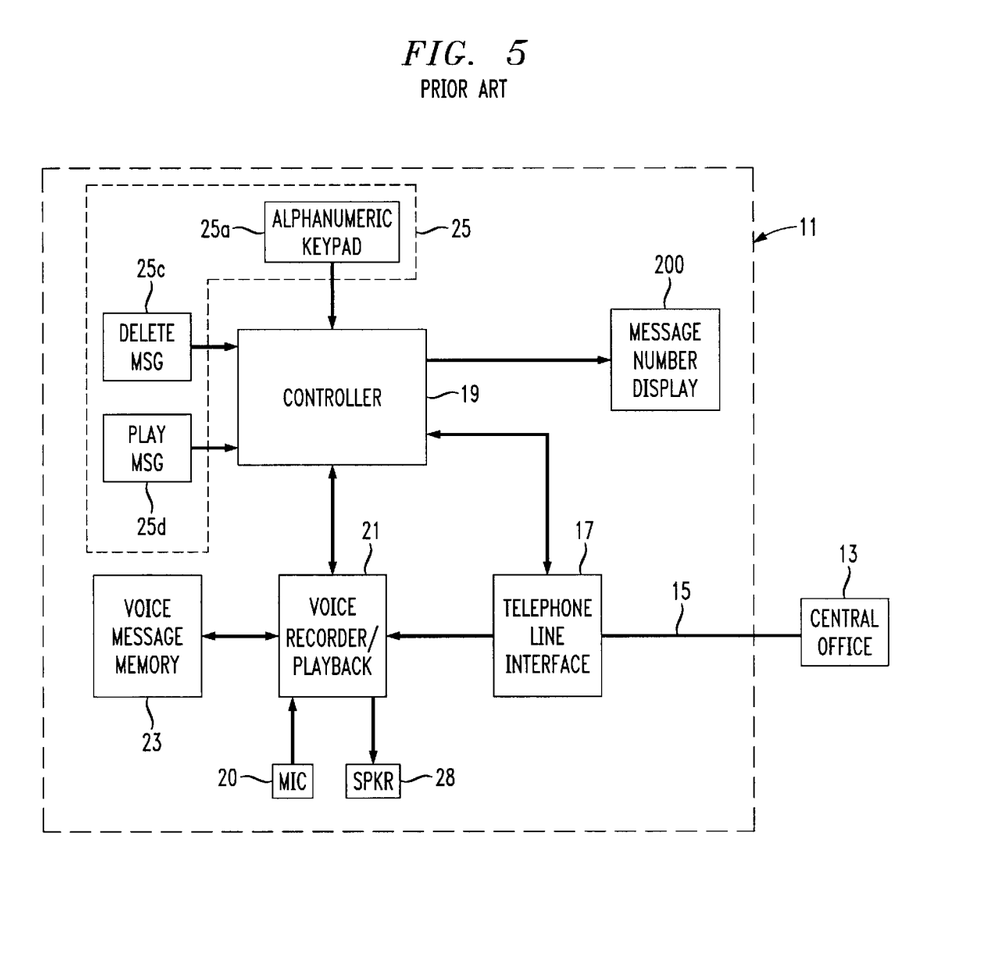
FIG. 5 shows a conventional voice messaging machine (e.g., a telephone answering device) including a digital audio database comprised in voice message memory.

For instance, FIG. 5 shows a conventional voice messaging machine (e.g., a telephone answering device) including a digital audio database comprised in voice message memory.

More particularly, in FIG. 5, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. The controller 19 is typically a suitable microprocessor, microcontroller, or digital signal processor (DSP). The ring detect signal indicates to the controller 19 the ringing of an incoming telephone call on the telephone line 15.

After a desired number of ring signals, the telephone answering device 11 causes the telephone line interface 17 to place the telephone line in an off-hook state, and instructs a voice recorder/playback module 21 to play a pre-recorded outgoing greeting message over the telephone line 15 to the calling party. Upon completion of the outgoing greeting message, the calling party may leave a voice message in voice message memory 23 under the control of the controller 19. A plurality of voice messages recorded by a corresponding plurality of calling parties form a plurality of digital audio segments forming a database within the voice message memory 23.

A user of the telephone answering device 11 later selects a particular voice message (i.e., digital audio segment) from the database in the voice message memory 23 by message number, or perhaps using Caller ID text information associated with a particular underlying voice message.

Upon manual selection, the user retrieves the recorded voice message from the voice message memory, using the user control keys 25 or other buttons or controls for selecting various modes of operation, and then deletes the voice message if desired. The user control keys 25 include an alphanumeric twelve-key keypad 25a to allow the user to manually dial a telephone number and use the telephone answering device 11 as an otherwise conventional telephone (using a handset, not shown). The user control keys 25 further include voice message playback control buttons such as REW, FF, STOP, PLAY 25d, and REC.

To make room for new voice messages, voice messages may be deleted using a delete message button 25c or other appropriate control. When deleted, the entire voice message is effectively erased from the voice message memory 23 (e.g., by allowing new voice messages to overwrite all portions of the deleted voice message).

A voice message number display 200 indicates a sequential message number, e.g., 1, 2, 3 . . . to assist the user in selection of a particular voice message from the voice message memory 23.

Figure 6A:
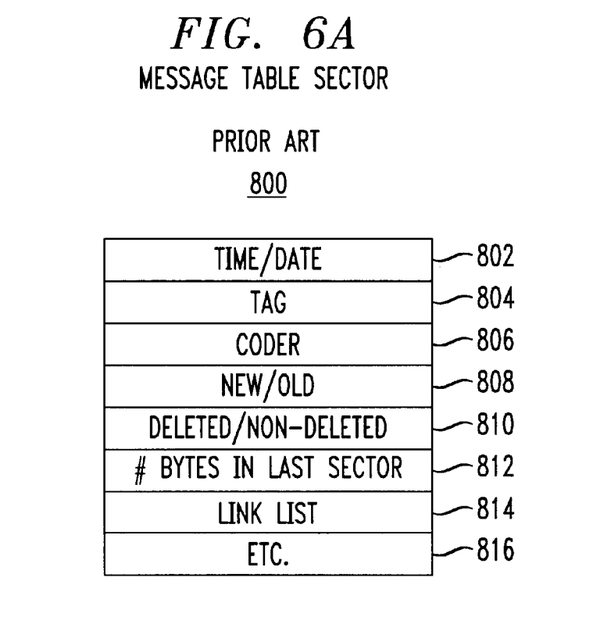
FIG. 6A illustrates an exemplary voice message table contained in one sector of the voice message memory.

FIG. 6A illustrates an exemplary voice message table 800 contained in one sector of the voice message memory 23.

In particular, in FIG. 6A, the message table 800 contains various header information relating to an underlying voice message stored in the same or linked page of voice message memory 23. Conventional header type information includes a time/date stamp 802 indicating the time and date when an underlying speech message was stored. TAG information 804 in the header contains user defined data. Typically, to maximize efficiency in the conventional digital answering machine 11, the speech data is encoded. Thus, the header includes coder information 806 identifying the type of encoding used to encode the underlying voice message data, e.g., the particular coded data rate. The new/old information 808 entry in the header of the message table 800 relates to whether or not the underlying speech message has been reviewed at least once by the user of the digital answering machine 11. The deleted/non-deleted information 810 in the header conventionally indicates whether or not the underlying voice message has been deleted by the user. The number of bytes in the last sector information 812 relates to the length of the voice message in the last sector in which the voice message is stored, avoiding replay of the unused end portion of a partially used last sector when replaying the relevant voice message. Link list information 814 in the header indicates the addresses of all sectors used to store the relevant voice message. Some systems include additional header information 816 in the message table 800.

Figure 6B:
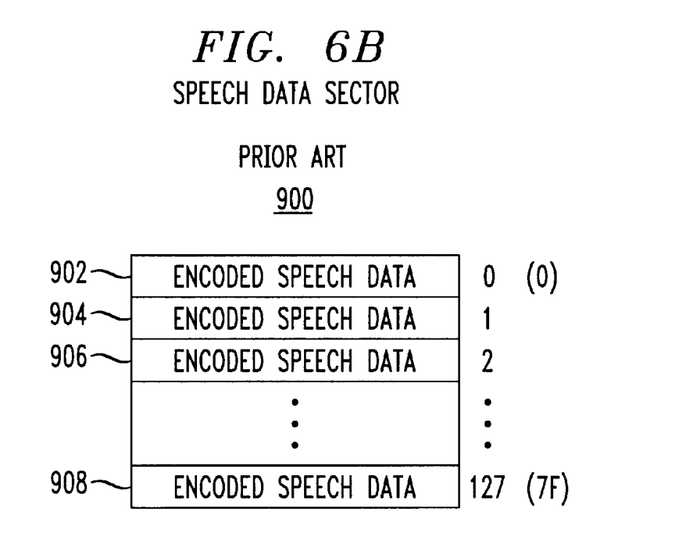
FIG. 6B shows an exemplary speech data sector in the voice message memory containing the underlying voice message.

FIG. 6B shows an exemplary speech data sector 900 in the voice message memory 23 containing the underlying voice message 902–908. The speech data sector 900 shown in FIG. 6B is the first listed in the link list 814 of the message table 800 for the underlying voice message. Zero, one or more pages of speech data 902–908 may be listed in the link list 814 of a message table 800 for a single voice message.

Voice messages stored in conventional digital audio databases such as the Flash memory voice message memory 23 of a telephone answering device are selected using identification information such as a message number or Caller ID information. However, if the user does not have knowledge of the substantive content of a particular voice message, they are not able to substantively search the particular voice message but rather must listen to the voice message to manually determine the substantive content of the message.

There is a need for an improved search technique and apparatus for automatically locating a particular message or audio track containing particular content within a larger digital audio database such as a CD, Flash memory, hard drive, cassette tape, etc., without requiring a user to manually browse through the audio tracks or messages stored in the digital audio database.

SUMMARY OF THE INVENTION

In accordance with the principles of the present invention, a digital audio search module comprises a voice clip search module, a digital audio database including a plurality of audio segments, and a text storage medium including a plurality of textual information relating to a corresponding plurality of portions of at least one of the plurality of audio segments.

A method of marking individual entries of a digital audio storage medium for textual search in accordance with another aspect of the present invention comprises associating individual text with each of a plurality of portions of each audio segment stored in the digital audio storage medium. A time stamp is provided with each associated individual text.

A method of searching for an individual audio segment stored on a digital audio storage medium in accordance with yet another aspect of the present invention comprises entering a desired text string for search. A text storage medium is searched for at least a close match of the desired text string. A location of a corresponding audio portion of the desired text string is determined in the individual audio segment.

After the location of the voice clip is found, the audio track or voice message can be played back from the beginning of the audio track or voice clip, from the location of the voice clip, or other point in relation to the located voice clip.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to a technique and apparatus to allow a digital search of the entries in a digital audio database such as the Flash memory of a telephone answering system, the hard drive of a voice messaging system, the audio tracks on a compact disk, a cassette tape, a digital video disk (DVD), a videotape, etc. In the disclosed embodiment, each entry in the digital audio database (e.g., each audio track, each voice message, etc.) is converted into textual information, and the converted textual information is associated with a particular audio segment within the digital audio database.

The textual information allows a digital search to be performed for a particular voice message, or portion of a voice message, in a telephone answering device, or for a particular song on a music CD, etc. Once the particular audio segment(s) containing a particular textual string is (are) located, that particular audio segment may be played or otherwise accessed, either in whole or in relevant part.

The principles of the present invention are described with respect to the particular embodiments of a telephone answering device and of a compact disk player. However, the principles of the present invention relate equally to any search mechanism for a particular digital audio segment stored in a database.

Figure 1:
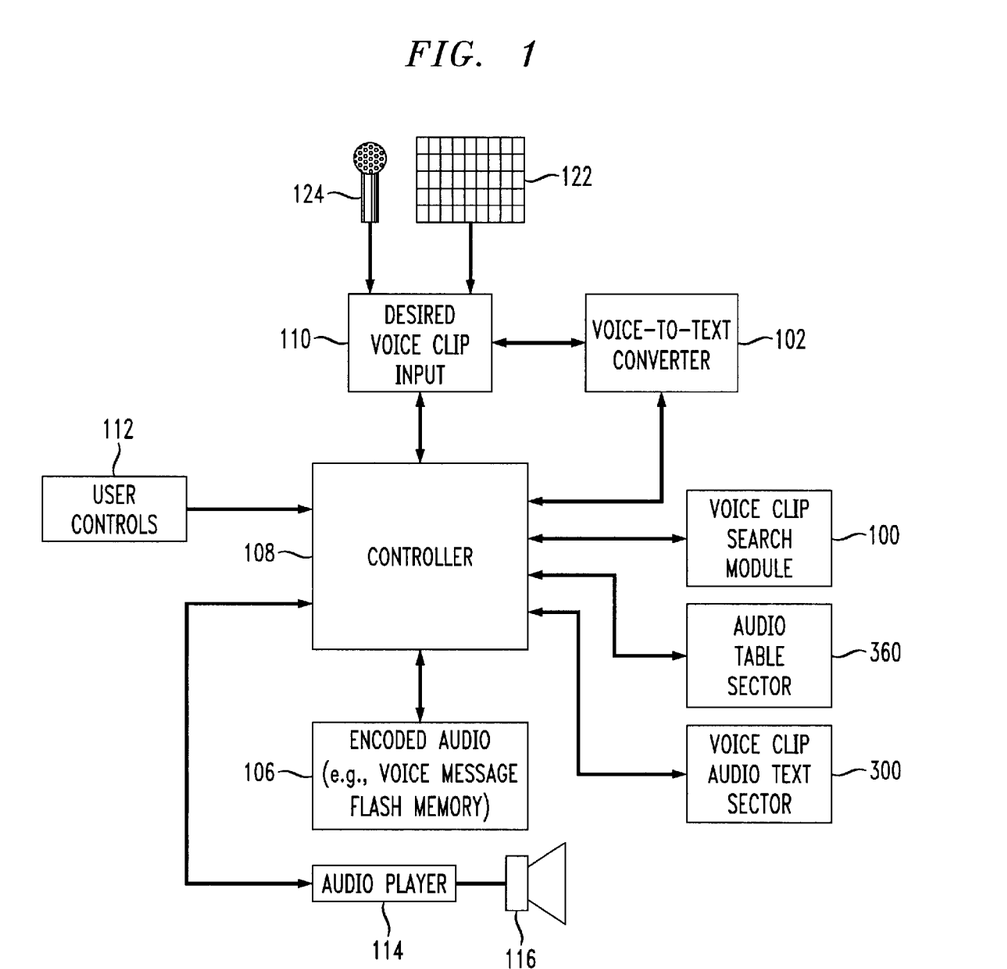
FIG. 1 shows an embodiment of the present invention forming a telephone answering device wherein the text of a desired voice clip is input by a user, and a search is performed through the audio database for an entry containing the desired voice clip textual information, in accordance with the principles of the present invention.

FIG. 1 shows an embodiment of the present invention forming a telephone answering device wherein the text of a desired voice clip is input by a user, and a search is performed through the audio database for an entry containing the desired voice clip textual information, in accordance with the principles of the present invention.

In particular, in FIG. 1, the relevant portions of a telephone answering device includes a controller 108, a voice message playback/recorder module 114, associated speaker 116, and appropriate user controls 112.

The controller 108 may be any suitable processor, e.g., microprocessor, microcontroller, or digital signal processor (DSP). The controller 108 controls the overall functionality of the telephone answering device.

The audio player 114 includes appropriate encoding and/or decoding and audio amplification necessary (e.g., a codec) to output voice messages stored in voice message memory (e.g., the encoded audio database 106).

The user controls 112 are particular to the application, but in the case of a telephone answering device may include the conventional PLAY, REC, FF, REW, DELETE, etc. buttons.

Importantly, the telephone answering device includes a voice clip search module 100 capable of accepting a textual search request, and of executing or performing that requested search through entries stored in the encoded audio database 106. The voice clip search module 100 is shown as a program module executing within the program code of the controller 108. However, the voice clip search module 100 may be operating external to the controller 108 (e.g., with a separate processor) within the principles of the present invention.

In the disclosed embodiment, a text string corresponding to a desired voice clip is input to the voice clip search module 100 via the controller 108. However, the text string may be input to the voice clip search module via an alternative path, e.g., from a separate processor.

As shown, convenience is provided to the user by allowing the user to speak the substance of the desired text string into a microphone 124, which is then digitized using, e.g., a codec or analog-to-digital converter, in an appropriate desired voice clip input device 110. The digitized speech is then recognized by a voice-to-text converter module 102. The voice-to-text converter module 102 is an appropriate software program (e.g., DRAGON DICTATE TM commercially available from Dragon systems) trained to the user's voice.

As an alternative to the vocal input of a desired textual search string, the desired textual string may be input using an appropriate alphanumeric keyboard 122.

In accordance with the principles of the present invention, substantive text of one or more entries in the appropriate digital audio database (e.g., voice message memory) may be input manually by a user (e.g., using the keyboard 122) and associated both with a particular voice message or audio segment, and with a particular portion of an individual voice message or audio segment.

For instance, given the example embodiment of a voice messaging system, a user might listen to a particular message, and occasionally type in textual indexing information into the keyboard 122. The controller 108 in turn places the typed information in an appropriate voice clip audio text sector or other memory location 300, together with appropriate linking information in, e.g., an audio table sector 360 to link the particular text string with the current portion of a voice message as it is played.

In a more sophisticated automated implementation, the substance of one or more voice messages stored in the voice message memory (i.e., in the encoded audio memory 106) may be converted to text using the voice-to-text converter module 102, stored in the voice clip audio text sector 300, and associated with the appropriate portion of the converted digital audio segment (e.g., voice message) in the audio table sector 360.

Figure 2A:
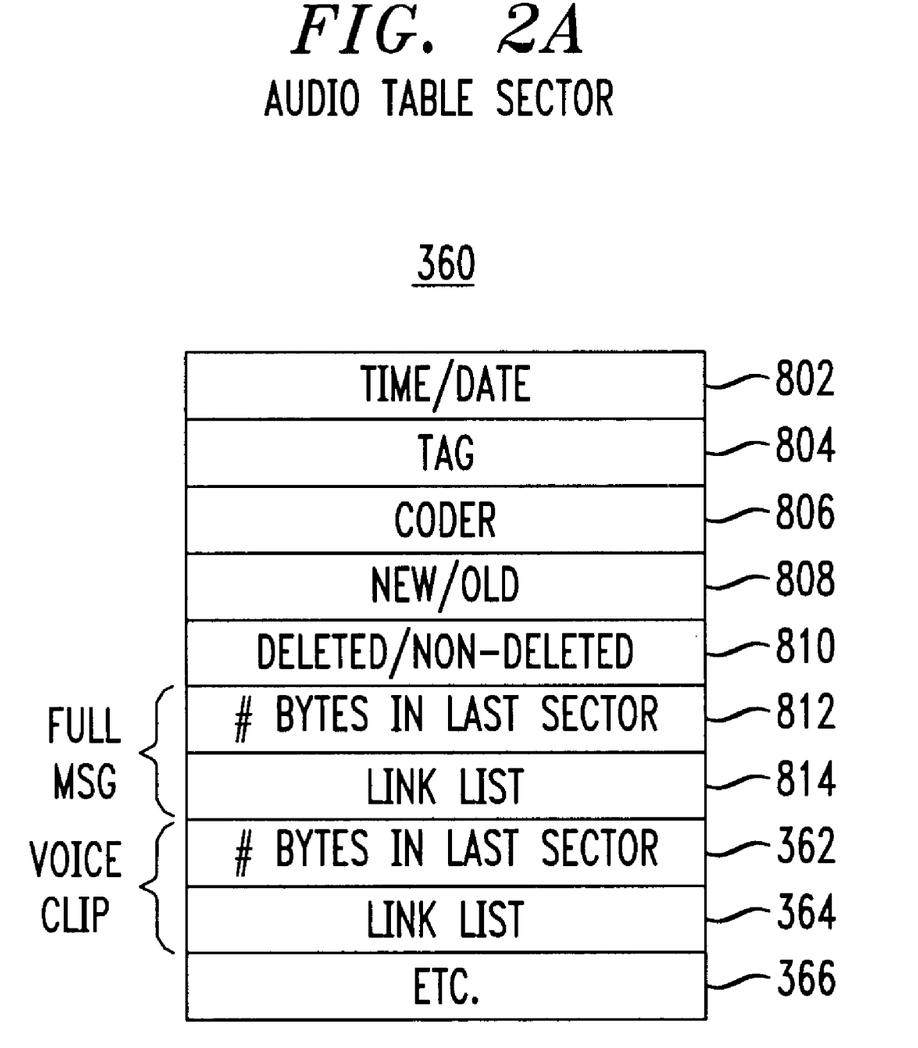
FIGS. 2A and 2B show an exemplary audio table sector and an exemplary voice clip audio text sector, respectively, of the telephone answering device embodiment shown in FIG. 1.
Figure 2B:
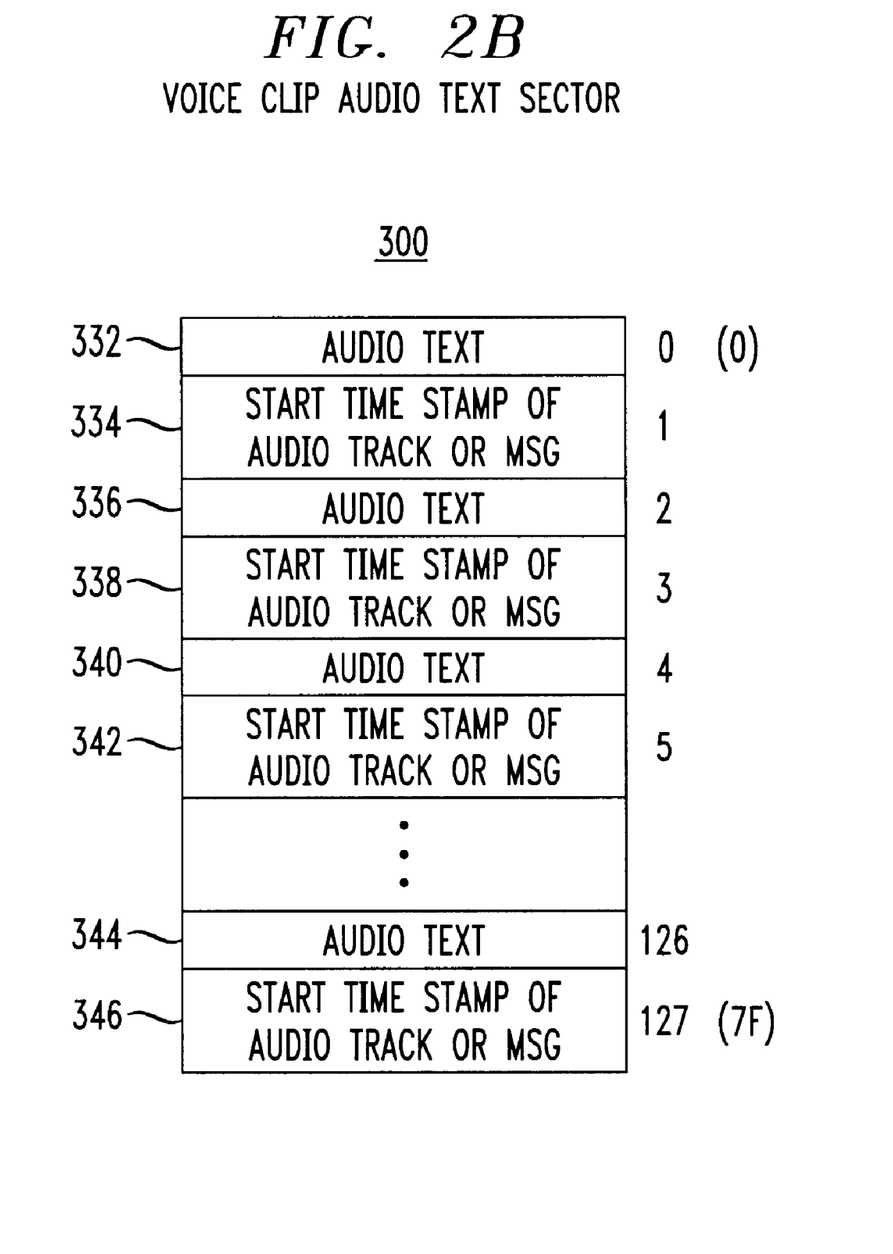

FIGS. 2A and 2B show an exemplary audio table sector 360 and an exemplary voice clip audio text sector 300, respectively, as shown in the telephone answering device embodiment of FIG. 1.

In particular, in FIG. 2A, an exemplary audio table sector 360 includes the time/date 802, TAG 804, coder 806, new/old 808, deleted/non-deleted 810, number of bytes in last sector 812, and link list 814 information as shown and described with respect to a conventional message table sector 800 shown in FIG. 6A. However, in this exemplary embodiment, the audio table sector 360 shown in FIG. 2A further includes link information to certain textual information 362, 364, etc. corresponding to an audio segment.

FIG. 2B shows an exemplary voice clip audio text sector to which the link list 364 of the audio table sector 360 would point.

In particular, in FIG. 2B, an exemplary voice clip audio text sector could contain a series of textual strings 332, 336, 340, 344, respectively together with start time stamps 334, 338, 342, 346 of the textual strings 332, 336, 340, 344 with respect to the underlying digital audio segment (e.g., voice message, song track, etc.).

Thus, for instance, the user may have previously listened to a particular voice message on a telephone answering machine, and at an appropriate point during playback entered a text string such as "sally calling about her family picnic" into the keyboard 122. The controller 108 would have input that text string as an audio text entry 332, together with the relative time stamp (e.g., 12 seconds into the voice message) of the location of the voice clip associated with that audio text.

Thereafter, the voice clip search module 100 can, at the user's request, search for the particular voice message and even the particular point 12 seconds into the relevant voice message, from among all voice messages stored in the voice message memory 106.

Figure 3:
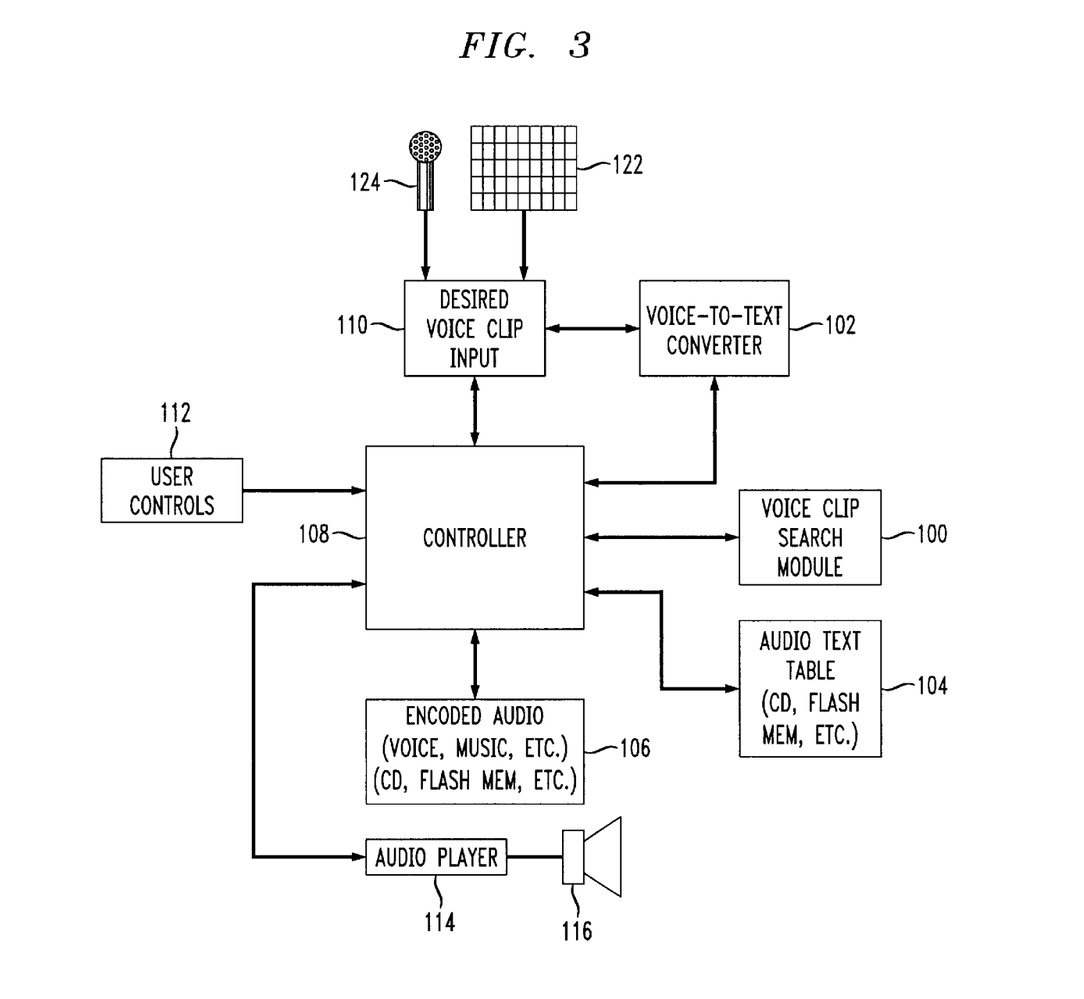
FIG. 3 shows an embodiment of the present invention more particularly suited to a compact disk (CD) player, replacing the audio table sector and voice clip audio text sector shown in FIG. 1 with an audio text table, in accordance with the principles of the present invention.

FIG. 3 shows an embodiment of the present invention more particularly suited to a compact disk (CD) player, in accordance with the principles of the present invention.

In particular, in FIG. 3, the audio table sector 360 and voice clip audio text sector 300 shown in FIG. 1 is replaced with an audio text table 104. Thus, instead of the Flash memory-type sectors in the example of FIGS. 2A and 2B, the storage of substantive text relating to audio segments (e.g., songs) may be stored in an audio text table 104 on the CD, together with appropriate time stamp information.

Figure 4:
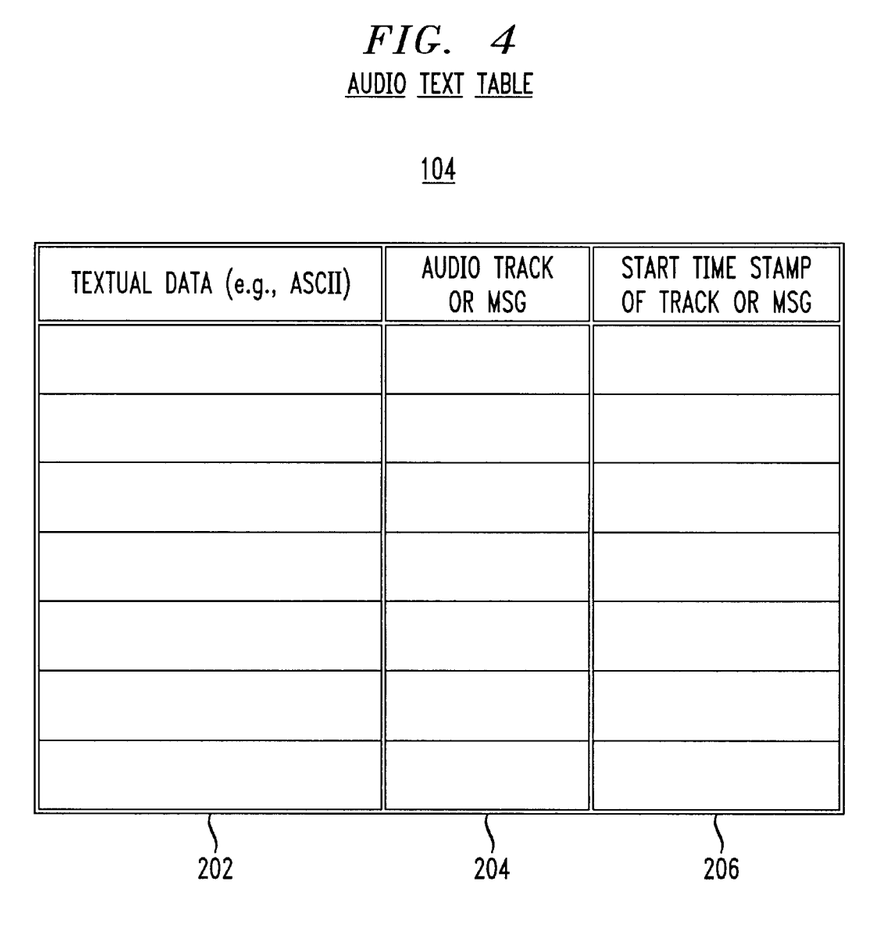
FIG. 4 shows exemplary information contained in an appropriate audio text table shown in FIG. 3.

FIG. 4 shows exemplary information contained in an appropriate audio text table 104 shown in FIG. 3.

In the example of a music CD, the manufacturer of the music CD may include the full text of each song contained within the CD in a separate file, but with time stamp links on a word by word basis, on a verse by verse basis, or other appropriate interval. This would allow a user to input either through a microphone 124 or through a keyboard the desired words of the song which is to be searched. In response, the voice clip search module 100 would search the audio text table 104 and search for a match (or even a closest but not exact match) to the desired input text, and queue up for playback the particular song or particular segment of a song starting at the relevant matching time stamp.

While the invention has been described with reference to the exemplary embodiments thereof, those skilled in the art will be able to make various modifications to the described embodiments of the invention without departing from the true spirit and scope of the invention.

What is claimed is:

1. A digital audio search module adaptively connected to a voice messaging system, comprising:

a voice clip search module;

a digital audio database including a plurality of audio segments;

a speech-to-text converter to produce a plurality of textual information substantially corresponding word for word to a corresponding plurality of said audio segments; and     a text storage medium including said plurality of textual information;

wherein said voice clip search module is adapted to search for a match in text in said plurality of textual information, and allow retrieval of one of said plurality of audio segments corresponding to a matched one of said plurality of textual information stored in said voice messaging system.

2. The digital audio search module according to claim 1, wherein:
each of said plurality of textual information is time stamped.

3. The digital audio search module according to claim 1, wherein:
said association is based on a relative time from a start of playback of said relative audio segment.

4. The digital audio search module according to claim 1, wherein:
said digital audio database is formed in Flash memory.

5. The digital audio search module according to claim 1, wherein:
said digital audio database is formed in an optical disk.

6. The digital audio search module according to claim 1, wherein:
said digital audio database is formed in a hard drive.

7. A method of marking individual entries of a digital audio storage medium for textual search, comprising:
converting with a speech-to-text converter to produce a plurality of textual information substantially corresponding word for word to a plurality of audio segments;
associating individual text produced by said speech-to-text converter to with each of a plurality of portions of each audio segment stored in said digital audio storage medium;
providing a time stamp with each associated individual text; and
searching said associated individual text for a user provided text string;
wherein said digital audio storage medium is adaptively connected to a voice messaging system.

8. The method of marking individual entries of a digital audio storage medium for textual search according to claim 7, wherein:
said digital audio storage medium is a compact disk.

9. A method of searching for an individual audio segment stored on a digital audio storage medium adaptively connected to a voice messaging system, comprising:
converting an individual audio segment from speech to converted text;
entering a desired text string for search;
searching a text storage medium containing said converted text for at least a close match of said desired text string; and
determining a location of a corresponding audio portion of said desired text string in said individual audio segment stored on said digital audio storage medium adaptively connected to said voice messaging system.

10. The method of searching for an individual audio segment stored on a digital audio storage medium according to claim 9, further comprising:
playing said audio segment starting from a beginning of said audio segment.

11. The method of searching for an individual audio segment stored on a digital audio storage medium according to claim 9, further comprising:
playing said audio segment starting from said corresponding audio portion.

12. The method of searching for an individual audio segment stored on a digital audio storage medium according to claim 9, wherein said step of entering comprises:
performing voice-to-text conversion of a search string spoken by a user.

13. Apparatus for marking individual entries of a digital audio storage medium for textual search, comprising:
means for converting with a speech-to-text converter to produce a plurality of textual information substantially corresponding word for word to a plurality of audio segments;
means for associating individual text produced by said speech-to-text converter to with each of a plurality of portions of each audio segment stored in said digital audio storage medium;
means for providing a time stamp with each associated individual text; and
means for searching said associated individual text for a user provided text string;
wherein said digital audio storage medium is adaptively connected to a voice messaging system.

14. Apparatus for marking individual entries of a digital audio storage medium for textual search according to claim 13, wherein:
said digital audio storage medium is a compact disk.

15. Apparatus for searching for an individual audio segment stored on a digital audio storage medium adaptively connected to a voice messaging system, comprising:
means for converting an individual audio segment from speech to converted text;
means for entering a desired text string for search;
means for searching a text storage medium containing said converted text for at least a close match of said desired text string; and
means for determining a location of a corresponding audio portion of said desired text string in said individual audio segment stored on said digital audio storage medium adaptively connected to said voice messaging system.

16. The apparatus for marking individual entries of a digital audio storage medium for textual search according to claim 15, wherein said means for entering comprises:
means for performing voice-to-text conversion of a search string spoken by a user.

* * * * *